United States Patent [19]
Humphrey

[11] Patent Number: 6,097,450
[45] Date of Patent: Aug. 1, 2000

[54] METHOD AND APPARATUS FOR ENHANCED HIGH-SPEED PERCEPTION (EHP) OF A MOVING OBJECT USING AN OPTICAL SHUTTER SPECTACLE

[75] Inventor: John M. Humphrey, Los Gatos, Calif.

[73] Assignee: Humphrey Engineering, Inc., Los Gatos, Calif.

[21] Appl. No.: 08/717,418

[22] Filed: Sep. 20, 1996

[51] Int. Cl.[7] .................................. G02F 1/133
[52] U.S. Cl. ....................... 349/13; 351/44; 351/246
[58] Field of Search .......................... 349/13, 14, 15; 351/44, 158, 246

[56] References Cited

U.S. PATENT DOCUMENTS

| | | | |
|---|---|---|---|
| 4,279,474 | 7/1981 | Belgorod | 349/13 |
| 4,698,668 | 10/1987 | Milgram | 349/13 |
| 4,907,860 | 3/1990 | Noole | 349/15 |
| 5,276,539 | 1/1994 | Humphrey | 349/14 |

FOREIGN PATENT DOCUMENTS

| | | | |
|---|---|---|---|
| 93/24858 | 12/1993 | WIPO | 349/14 |

*Primary Examiner*—William L. Sikes
*Assistant Examiner*—Tai V. Duong
*Attorney, Agent, or Firm*—John J. Leavitt

[57] ABSTRACT

Presented is a method and apparatus for providing human visual physiology with a perceived continuous image of a fast-moving object formed by a series of visual pulses each followed by a period of visual blockage where the frequency of these repetitive pulses/blockages is selectively adjusted to be close to the actual flicker fusion frequency of the observer at the perceived brightness of the visual pulses. The objective of this method is to provide the observer with enhanced visual. perception of fast-moving objects. The method and apparatus presented is intended for use under natural lighting conditions and continuous artificial lighting conditions and is accomplished by spectacles with optical shutter lenses. The lenses are alternately opened to provide the wearer with an unhampered view of the surroundings and then closed to block out the view and as much light transmissibility as possible. The optical shutter lenses operate near the flicker fusion frequency of the wearer to ideally provide only one image in each visual frame of the viewer and in actual, practice to provide as few double image frames as possible.

16 Claims, 4 Drawing Sheets

REAR VIEW

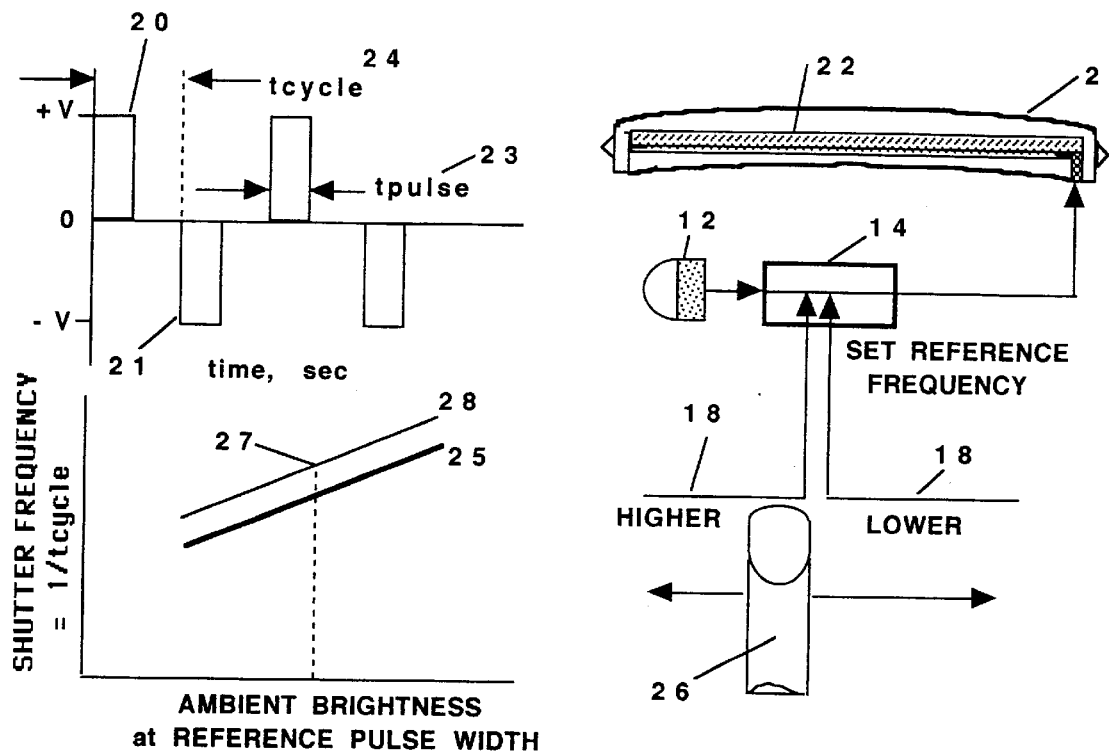
FIG 3: CONTROL SCHEMATIC
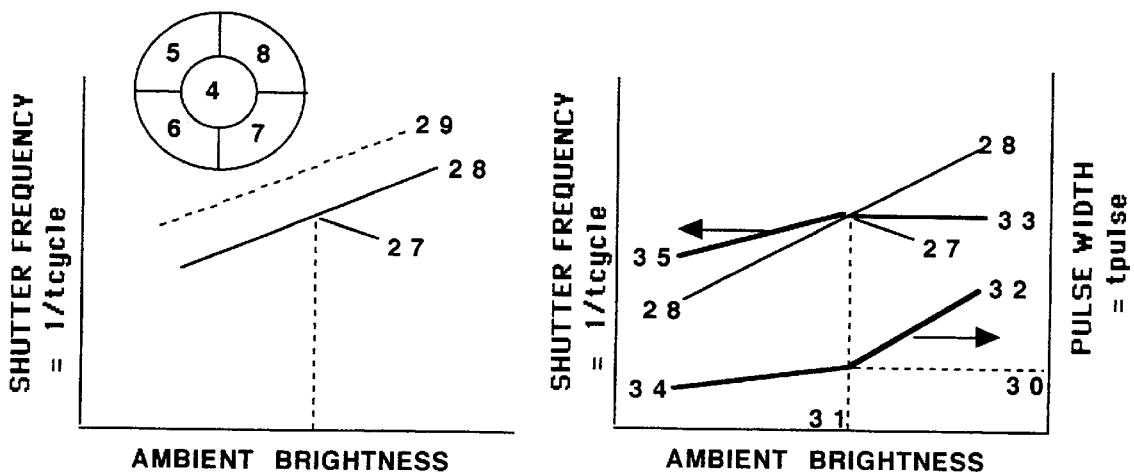
FIG 4   PERIPHERAL NODE FREQUENCY ADJUSTMENT
FIG 5   LEVEL 3 CONTROL

METHOD AND APPARATUS FOR ENHANCED HIGH-SPEED PERCEPTION (EHP) OF A MOVING OBJECT USING AN OPTICAL SHUTTER SPECTACLE

BACKGROUND OF THE INVENTION

1. Field of the Invention

This invention relates to the method and means for enhancing human visual perception of a moving object, and particularly to spectacles equipped with optical shutters that function to enhance the ability of the human visual physiology to track the path of an object moving at high speed.

2. Description of the Prior Art

This invention is an improvement on the method and apparatus of the following United States patents relating to the use of optical shutter spectacles to control the level of ambient brightness perceived by the human eye through the spectacles:

Belgorod 4,279,474

Humphrey 5,276,539

U.S. Pat. No. 4,279,474 discloses a method and apparatus for controlling the level of brightness perceived by the human eye by using spectacles that operate as a variable duty cycle electronically controlled shutter. The shutter frequency is maintained above the flicker fusion frequency of the human eye to achieve a perceived continuous image of reduced brightness. U.S. Pat. No. 5,276,539, issued to the inventor of the instant invention, discloses a method and apparatus for nodalizing a spectacle lens and independently controlling the light transmission through a selected node or nodes in response to the ambient brightness in that nodal portion of the field of view.

The accurate and timely perception of motion of a moving object in relation to its surroundings, or vice versa, is one of the most important capabilities of our human visual physiology. The motion picture camera analogy provides a useful though incomplete model to help understand the process of motion perception of a moving object by the human visual physiology. In this analogy the human visual physiology presents the brain with a series of images in a manner analogous to the frames in a roll of motion picture film. The camera's frame rate is equivalent to an individual's flicker fusion frequency which varies with ambient brightness and which has been determined to vary from individual-to-individual. The brain evaluates the images on each frame and compares the evaluated images on successive frames for changes. Objects that change position between successive frames are perceived as moving. By measuring the magnitude and direction of the change in an object's position between successive frames, and knowing the interval of time between successive frames, the brain attempts to calculate the object's velocity and then predict the future location of the object in both space and time. This process works well for objects that move relatively slowly where slowly is defined by the relative motion of the object during the period of each optical frame. Such slow moving objects present a relatively distinct image in each frame with small changes in position between successive frames.

Accurate perception of fast moving objects is one of the most challenging tasks for our human visual physiology. Fast moving objects appear blurred, i.e. obscure or indistinct, because they undergo significant motion relative to their physical dimensions in each optical frame. Resolving the motion of such fast moving objects is difficult because their large relative motion in each frame creates a large uncertainty in their actual location in that frame. Since motion prediction in terms of velocity and direction is based on comparing the change in an objects position between successive frames, an increase in an object's position-uncertainty in each visual frame results in an increase in the uncertainty of its velocity between successive frames and an inability to accurately predict the future position of the object.

Accurate perception of objects moving toward us at high speed is an even more challenging task for our human visual physiology. Our ability to perceive objects moving across our field of view can be enhanced by moving our head to keep the object at the same location in the field of view. An example of this phenomena is exemplified by spectators watching a horse race. Moving our head with the moving object creates a distinct object in each frame, but causes the background to blur. However we can still resolve the motion of the object against large background objects, or in the absence of a background, use the head position information supplied to the brain from our neck muscles as when we catch a pop fly ball in baseball.

Many competitive sports include visual resolution of high speed motion as an important part of their competitive challenge. A partial list of sports that require excellent visual perception of a small fast moving object include baseball, tennis, table tennis, polo, volleyball, the goalie positions for ice hockey and soccer, and the pass receiver for football. Several other sports require a participant to maneuver while traveling along a course which requires accurate visual perception of a background that is moving fast relative to the visual frame rate of the participant. These sports include downhill ski racing and race car driving.

Accordingly the primary object of this invention is to provide a method and apparatus that enhances the ability of the human visual physiology to resolve the motion of a fast-moving object, especially one moving toward the observer, to more accurately predict the object's future position to thereby enable initiation of a more timely and more appropriate physical response to meet the challenge or threat posed by the fast-moving object.

Another important object of the present invention is to further enhance perception of an object moving at high speed by providing contrast control of the background relative to which the object is moving.

The invention possesses other objects and features of advantage, some of which, with the foregoing will be apparent from the following description and the drawings. It is to be understood however that the invention is not limited to the embodiment illustrated and described since it may be embodied in various forms within the scope of the appended claims.

SUMMARY OF THE INVENTION

In terms of broad inclusion, the invention comprises the method of providing the human visual physiology with a perceived continuous image of a linearly fast moving object formed by a series of visual pulses each followed by a period of low illumination visual blockage where the frequency of these repetitive pulses/blockages is adjusted to be close to the actual flicker fusion frequency of the observer at the perceived brightness of the visual pulses. The objective of this method is to provide enhanced visual perception to enable prediction of the future location of continuous linearly fast-moving objects. The method achieves this objective firstly by operating near the flicker fusion frequency to provide only one image in each visual frame of the viewer and, secondly, by reducing the spatial uncertainty of the moving object in each visual frame by enabling viewing of the object for only part of each visual frame. This method for providing a human observer with enhanced ability to track the motion and predict the future path and location in space of a continuously fast-moving object using visual pulses whose frequency is adjusted close to the visual frame rate (i.e. flicker frequency) of the observer is entirely different from the classical strobe lighting effect used to freeze the image of a cyclically repeating visible event by matching the strobe light pulses to the cyclical frequency of the event.

The preferred embodiment of the method and apparatus of this invention intended for use under natural lighting conditions and continuous artificial lighting conditions comprises spectacles with optical shutter lenses. These lenses alternately open to provide the wearer with an unhampered view of the surroundings and then close to block both the view and as much light transmissibility as possible. The optical shutter lenses operate near the flicker fusion frequency of the wearer to ideally provide only one image in each visual frame of the viewer and in actual practice to provide as few double image frames as possible. The duty cycle (fraction of each cycle that the shutter is closed) is optimized for maximum visual perception for the particular high speed motion event and not for optimum brightness or visual comfort as in the sunglass applications of the prior art.

BRIEF DESCRIPTION OF THE DRAWINGS

FIG. 3 illustrates the control schematic for initial manual reference frequency adjustments and subsequent automatic frequency adjustments.

FIG. 4 graphically presents the method for peripheral node frequency adjustment by plotting shutter frequency as an ordinate value against ambient brightness at reference pulse width as an abscissa value.

FIG. 5 graphically presents a Level 3 control method to the method illustrated in FIG. 4 by adding pulse width timing as an ordinate value.

DESCRIPTION OF THE PREFERRED EMBODIMENT

The enhanced high-speed perception (EHP) optical shutter spectacles of the instant invention have the same nodalized LCD lense structures and the same basic electronic components as the optical shutter spectacles described in my U.S. Pat. No. 5,276,539 for perceived brightness control, the disclosure of which is included herein by reference. The improvements presented herein lie firstly in the additional understanding of how to control intermittent optical shutter visual pulses to achieve enhanced perception of fast-moving objects, which is an entirely different and novel concept and application of optical shutters from the control of perceived brightness taught in the referenced art. Secondly, the improvements continue with the further application of enhanced high-speed perception understanding through 1) careful control of the frequency of shutter operation to be always near to the flicker fusion frequency of the wearer at the wearer's perceived level of brightness with shutter operation to only produce one image of the fast-moving object in each visual frame of the wearer and 2) maintaining the duty cycle of the shutter (fraction of each cycle that the shutter is closed) high enough to significantly reduce the apparent blur of the visual image of the fast-moving object in each of the wearer's visual frames even if the resulting brightness is non-optimum.

The prior art describes both automatic adjustment of pulse width and frequency to provide control of perceived brightness. With the additional understanding of the enhanced high-speed perception (EHP) method and the modifications to the control of shutter frequency and pulse width through the control techniques described herein required to implement this method, the optical shutter spectacles described in U.S. Pat. No. 5,276,539 would be fully capable of performing the function of this invention. However in the interest of completeness, a detailed description of the EHP spectacle structure is presented with particular emphasis on the control techniques used for shutter frequency and pulse width to achieve enhanced high-speed perception of fast-moving objects.

Figure 1:
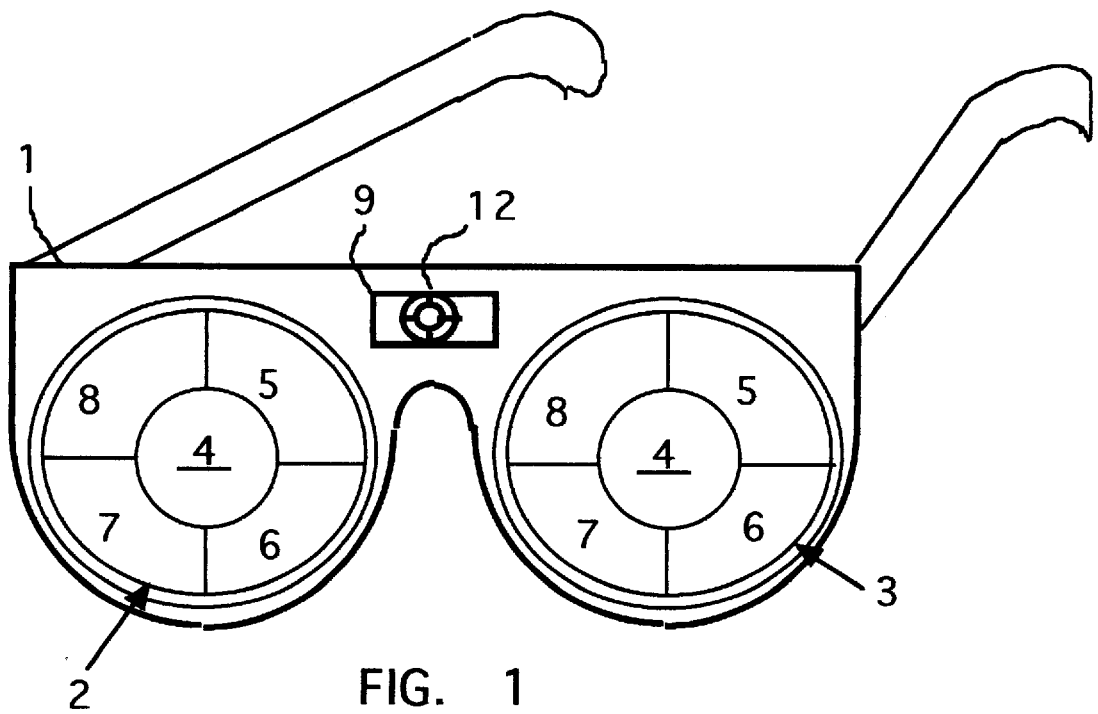
FIG. 1 is a frontal perspective view of spectacles incorporating nodalized lenses which each include a segmented liquid crystal display with each segment independently operable to provide the function of an optical shutter.

In terms of greater detail, the enhanced high-speed perception (EHP) optical shutter spectacles of the instant invention shown in FIG. 1 comprise a spectacle frame 1 having a nose bridge area and temple members and provided with a keyhole opening in the nose bridge area of the frame. The spectacles have a right lens 2 and a left lens 3, each incorporating a liquid crystal display assembly 22 as illustrated in FIG. 3. The lenses illustrated each have five nodes 4, 5, 6, 7 and 8 which operate independently of one another as described in U.S. Pat. No. 5,276,539 and incorporate the further improvements of this invention described and illustrated herein. The operation of the lenses is controlled by an electronics module 9 which is partially visible from the front through the keyhole opening in the nose bridge area of the spectacle frame. The front of the electronics module contains a nodalized light sensor array 12, correlated to the associated nodalized lenses, which independently senses the ambient brightness in each nodalized area of the field of view.

Figure 2:
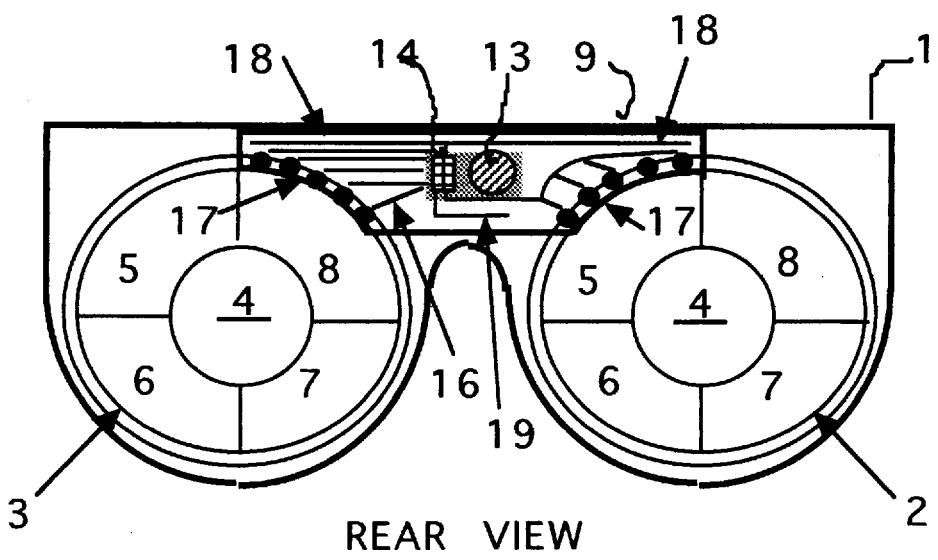
FIG. 2 is a rear elevational view of the spectacles of FIG. 1 with the temple members removed for clarity.

A rear view of the spectacles (i.e. as seen by the wearer) is presented in FIG. 2. The electronics module 9, shown in a partially broken away portion of the frame to make its components visible, is mounted into the keyhole opening in the nose bridge area of the frame from the rear. The electronics module contains a battery 13 to provide electrical power, an integrated circuit 14 to provide the transfer functions from the input light sensor signals to the output control signals to the individual LCD nodes of the lenses, leads 16 to carry the output signals for each node of the LCDs for each lens from the integrated circuit to contacts 17 on the edge of the module, two capacitive sensor wires 18 embedded near the top of the electronics module to provide user input control and another capacitive sensor wire 19 embedded at the bottom of the electronics module to sense the presence of the wearer's nose and thereby provide an automatic on/off signal for the spectacles. The edge contacts 17 on the electronics module mate with similarly placed contacts on the lenses to provide a path for the electrical signals to the various nodes of the two LCDs.

The integrated circuit 14, is commanded to optimally perform the Enhanced High-speed Perception functions of this invention through input signals provided by the nodalized light sensor array 12 and the two capacitive sensor wires 18 embedded near the top of the electronics module. The interaction of these components is shown in the control schematic presented in FIG. 3. The control functions performed by the integrated circuit 14, operate on several levels of sophistication. For clarity of presentation and brevity in this description, these control functions will be presented sequentially for each of the levels of sophistication with appropriate reference to the drawings. Due to both manufacturing cost and operational complexity, commercial embodiments of this invention may or may not provide all these functional levels.

The automatic features of Level 1 control as shown graphically in FIG. 3 adjust the frequency of the optical shutter in response to changes in ambient brightness to accommodate the flicker fusion rate of the user. The integrated circuit 14 is designed to provide an alternating series of positive voltage pulses 20 and negative voltage pulses 21 to a spectacle lens 2 which contains at least one liquid crystal display node 22 as shown in FIG. 3. For Level 1 sophistication control electronics, the pulse width called tpulse 23 in terms of time (t) is fixed, but the cycle duration called tcycle 24 in terms of time (t) is selectively variable. The integrated circuit 14 contains a pre-programmed function 25 of optical shutter cycle duration 24 versus ambient brightness.

This preprogrammed brightness vs optical shutter frequency function accounts for the light attenuation through the lens 2 due to both the steady state attenuation of the lens and the reduction in perceived brightness due to the operation of the shutter. The resulting pre-programmed function 25 is representative of the shutter frequency required to just avoid the perception of flicker in a typical individual as a function of ambient brightness as sensed by the light sensor array 12. Without any manual adjustment, the integrated circuit provides alternating voltage pulses 20 and 21 of fixed duration with a cycle duration, 24 that varies with ambient brightness by following the pre-programmed function 25.

This control system does not maintain constant brightness as in the referenced art, but rather maintains the shutter frequency just above the flicker frequency under changing brightness conditions for a typical wearer to maximize the wearer's ability to perceive high speed motion events by minimizing the number of double images of a fast moving object in the visual frames of the viewer.

The Level 1 sophistication control function provides for user selective adjustment of frequency. The electronics module 9 of FIG. 1 contains two embedded wires 18, one on each side of the nose bridge near the top of the frame. As shown in FIG. 3, when the wearer of the spectacles places a finger 26 on the top of the frame near the nose bridge area, the integrated circuit senses both a change in capacitance in both wires 18 and a difference in the capacitance between the wires. The change in capacitance signals the integrated circuit that the wearer wishes to change the shutter frequency, and the difference in capacitance between the wires resulting from the position of the finger (left or right) informs the integrated circuit of the desired direction of change in the frequency, with one side (left—as viewed from the wearer's point of view) indicating a desire for higher frequency to eliminate the perception of flicker, and the other side (right) indicating a desire for lower frequency to move closer to the flicker threshold. The integrated circuit slowly changes the shutter frequency in the desired direction.

When the wearer is satisfied with the frequency, he removes his finger from the bridge area of the frame. The change in capacitance informs the integrated circuit that a new desired frequency 27 has been reached and should be set at the current level of ambient brightness. The electronics remembers this new frequency 27, and creates a new adjusted frequency characteristic 28 parallel to the pre-programmed function 25 and passing through the new adjusted setpoint value 27. This manual adjustment accommodates variations in flicker frequency between users as well as drift in the sensor and electronics. The use of capacitance to adjust frequency is more convenient for the wearer than turning a knob or switch, and provides an invisible control inside the electronics module that is protected from the environment.

The invention accommodates the apparent phenomenon of a higher peripheral flicker fusion rate by operating the peripheral nodes of multinode lenses at a slightly higher shutter frequency than the center node. As shown in FIG. 4, peripheral nodes 5, 6, 7 and 8 operate on shutter frequency characteristic 29 that is automatically offset above the adjusted frequency characteristic 28 for the center node 4. Tests with optical shutter spectacles have indicated a higher flicker fusion frequency with peripheral vision than with central vision. In these tests, one lens was covered with a cardboard cutout having a center opening roughly matching the size of the center node 4 shown in FIG. 1, and on the other lens a circular opaque piece roughly matching the size of node 4 was taped, thus blocking view through the center of the lens. With the eye behind the center blocked lens closed, the frequency was adjusted to just eliminate flicker when looking through the lens with the unblocked center. Opening the other eye behind the lens with the blocked center, and keeping that eye looking at the blocked center resulted in flicker observed on the periphery. An increase of several Hz in the shutter frequency was required to achieve flicker free peripheral vision with the eye behind the center blocked lens. To ensure this effect was not due to off-axis dimming which reduces the perceived dimming on the periphery for LCD lenses, flicker free vision in the blocked center lens could be restored by simply moving the gaze of that eye off-axis to look directly at the unblocked periphery of the lens. However when the gaze was again directed at the blocked axial center of the lens, the perception of peripheral flicker returned. Peripheral node frequency adjustment in multinode lenses thus further enhances the EHP method by allowing shutter frequency at the center of the field of view to be closer to the flicker frequency without encountering the distraction of peripheral flicker.

Level 2 sophistication control allows the wearer to adjust pulse width (tpulse) for optimum EHP effects. Level 2 control is achieved when the wearer simultaneously uses two fingers and places one on each side of the capacitance wires 18. After a short delay the electronics initiates two long duration pulses which are perceived as visible flashes by the wearer, indicating that the electronics are now in the level 2 sophistication control mode. Now when the wearer places a finger on the left side of the nose bridge, the electronics slowly increase both the pulse width 23 and simultaneously make a small adjustment in the frequency characteristic 28 to account for the effective decrease in ambient brightness at reference pulse width caused by the increase in pulse width. Level 2 control allows the wearer to further optimize EHP effects by trading off the effect of a sharper, but reduced brightness image by increasing the pulse width. Similarly placing a finger on the right side of the nose bridge adjusts pulse width and frequency characteristic in the opposite direction. After making these adjustments, again placing two fingers over the capacitance control wires 18 resets the electronics to Level 1 control as confirmed by a single visible flash. If the Level 2 changes did not maintain an optimum shutter frequency, the user can make slight adjustments in the frequency while keeping his previously adjusted value of pulse width.

The EHP optical shutter operation provides enhanced motion perception over the entire field of view. However the best EHP is provided near the center of the lens primarily because of off-axis dimming effects and secondarily due to the peripheral node frequency increase. Liquid crystal displays only affect the component of incident light that is normal to the plane of the liquid crystal film. Light reaching the eye by passing through the periphery of the lens is incompletely blocked by the optical shutter action because of the large angle between the light ray and a normal to the lens surface at that point. Therefore, viewing moving objects through the periphery of the lens results in a dim image of the object even when the shutter is closed. This dim image throughout the entire visual frame will inevitably increase the perceived position uncertainty of the object and thereby reduce the EHP benefits. Fortunately human beings prefer to observe events with their eyes centered, and if time is available, automatically move their heads to center objects in the field of view. Therefore most events will be viewed through the center of the lens where the LCD shutter is most effective at providing enhanced high speed perception. For events that require rapid eye movement over the field of view, the LCD optical shutter spectacles of this invention will provide EHP over the entire field of view, but the EHP will be less effective near the periphery of the lens.

Level 3 sophistication control varies the pulse width to also provide modified brightness control as shown graphically in FIG. 5. The purpose of the EHP method is to provide a sharper image of a moving object and not to provide a uniform perceived brightness as in the prior art. Therefore enhanced high-speed perception requires that a significant period of each visual frame be blocked even if the resulting brightness is less than the wearer would otherwise consider optimum. As shown in FIG. 5, the reference pulse width 30 is either a fixed Level 1 sophistication value or adjusted Level 2 sophistication value. The reference light level 31 associated with the reference pulse width is established by the light level at the most recent manual adjustment of either frequency or pulse width. For ambient light levels above this reference 31, the pulse width 32 increases to both maintain reference brightness and further enhance EHP through a sharper image in each visual frame. The shutter frequency in this range does not follow the previous characteristic 28, but is constant at 33 because the increasing pulse width maintains a constant perceived brightness which maintains a constant flicker fusion frequency in the wearer of the EHP spectacles. For ambient lighting conditions below the reference 31 the pulse width follows a gradual programmed decrease 34 that balances the perceived brightness and image sharpness for optimum high speed motion perception. The shutter frequency 35 also decreases to follow the effect of the change in perceived brightness on the wearer's flicker rate.

Testing of the EHP method with optical shutter spectacles has qualitatively verified enhanced visual perception of objects moving towards the wearer, but not quantified the magnitude of enhanced athletic performance due to EHP. The great American sport of baseball provides an excellent opportunity to quantitatively model the ability of Enhanced High-speed Perception (EHP) technology to enhance human physical performance by improving the ability of the human visual physiology to resolve fast moving objects. For this study the ability of a batter to visually resolve the trajectory of a pitched baseball was selected for the analytical model.

Figure 6:
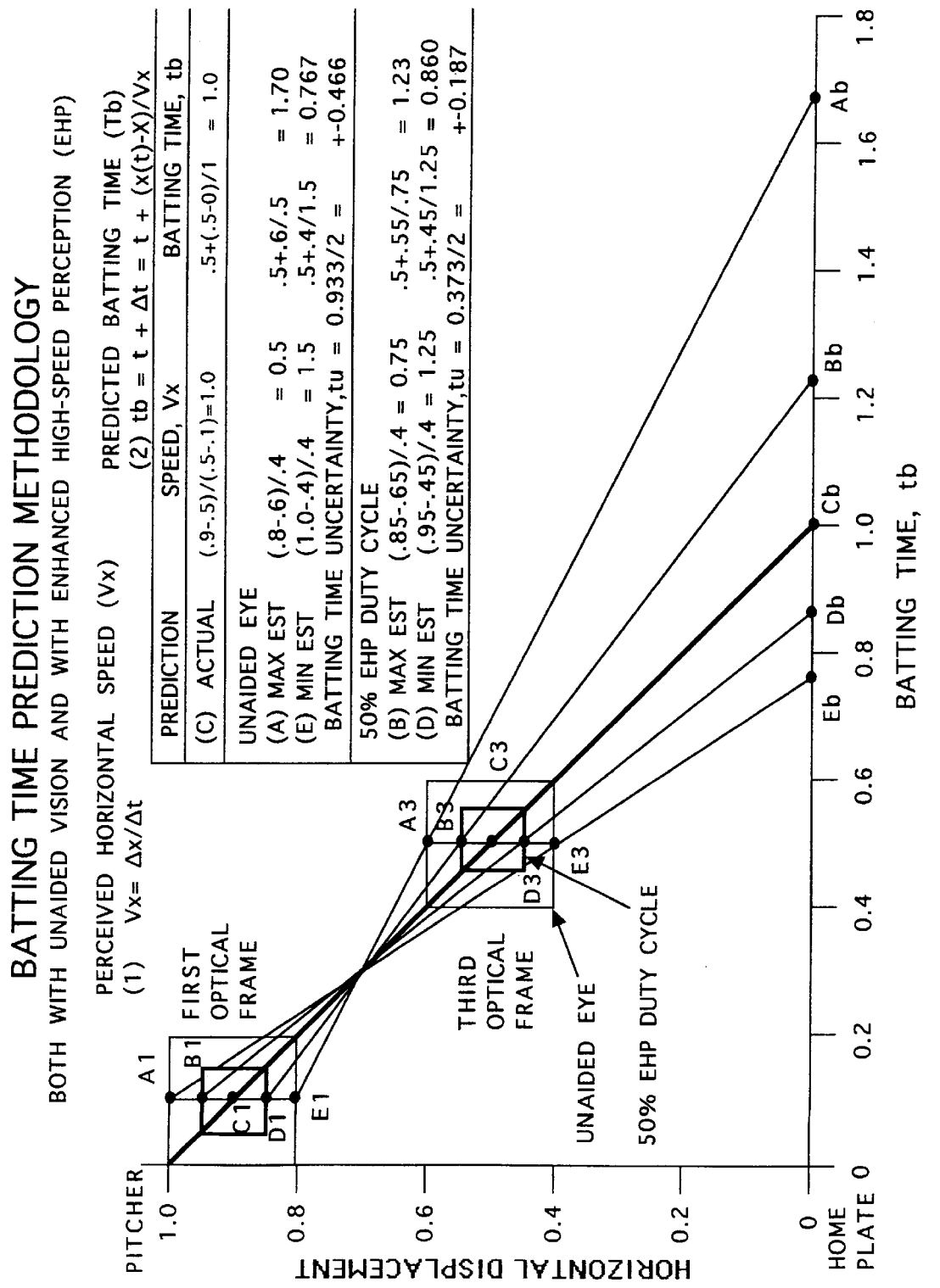
FIG. 6 graphically presents batting time prediction methodology for a pitched baseball and compares batting time prediction for both unaided vision and with enhanced high-speed perception according to this invention.

The fundamental understanding of EHP technology and its ability to improve human visual perception of high speed objects is presented graphically in FIG. 6 using batting time prediction as the example. At normalized time, tb=0, a pitcher pitches a baseball from a normalized horizontal distance of 1.0. The optical frame period in this example is 0.2 measured in normalized batting time. This analysis assumes that human visual physiology locates objects in time at the center time of each visual frame. Therefore in the first frame the ball appears to the batter as a blur over a horizontal displacement from A1 to E1 located at normalized time=0.1. Similarly, in the third optical frame, the ball appears as a blur over a horizontal displacement from A3 to E3 located at normalized time=0.5. The two equations of motion needed for this analysis are presented in equations (1) & (2) set forth in FIG. 6. Using the correct displacements of C1 and C3 of 0.9 and 0.5, respectively in the equation $Vx=\Delta X/\Delta t$ results in the actual normalized horizontal speed (Vx)=1.0 and normalized batting time (tb)=1.0. However as shown in FIG. 6, using the extreme locations in the first and third frames results in normalized batting time predictions ranging from 0.767 (using locations A1 and E3) to 1.7 (using locations E1 and A3) for a normalized batting time uncertainty of +−0.466. This analysis used a 50% EHP shutter duty cycle to halve the displacement uncertainty of the ball in each optical frame. With this reduced displacement uncertainty, the predicted batting times ranged from 0.860 (using locations B1 and D3) to 1.23 (using locations D1 and B3) for a normalized batting time uncertainty of +−0.187 which is a 60% reduction in batting time uncertainty due to EHP technology.

Figure 7:
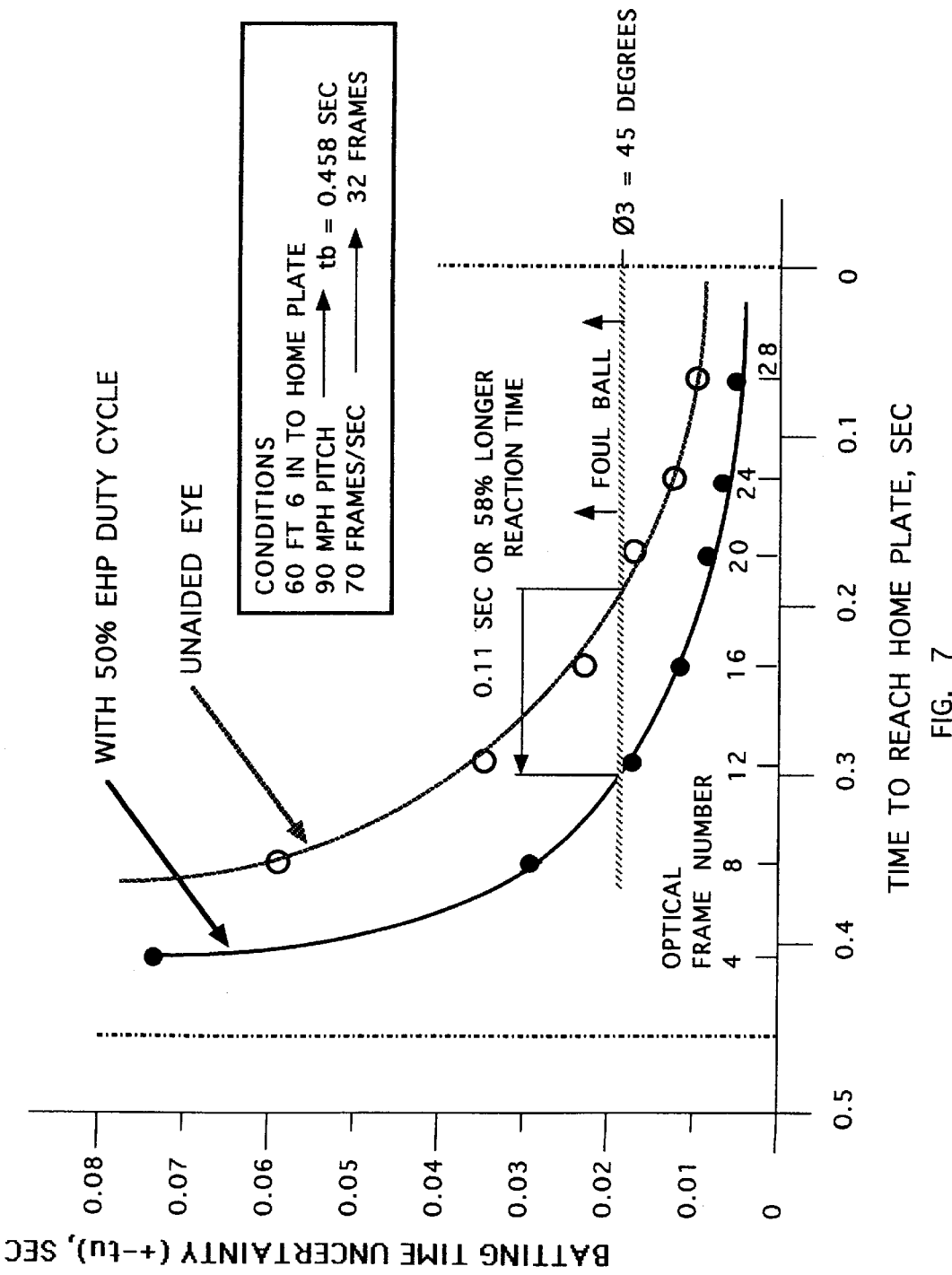
FIG. 7 graphically presents the effect of enhanced high-speed perception on calculated predicted batting time uncertainties.

The methodology presented in FIG. 6 was programmed on a personal computer and used to predict both the batting time uncertainty and the effect of that uncertainty on the likelihood of a foul ball. A 90 MPH fast ball requires 0.458 seconds to travel the 60.5 foot distance from the mound to home plate. A batter with a flicker fusion frequency of 70 frames per second will experience 32 visual frames during this pitch. FIG. 7 presents the batter's calculated batting time uncertainty during the pitch for both unaided vision and with EHP optical shutter spectacles with the shutter closed half the time on each frame. The results of this analysis predict a reduction in batting time uncertainty of about 50%. For a sport like baseball which pushes the limits of human visual response, such a reduction in batting time uncertainty would likely result in a significant improvement in batting average.

While the results of the preceding analysis are not expected to be precise, they indicate that the EHP method and apparatus of this invention can significantly enhance the ability of an observer to resolve fast moving objects especially under conditions that test the limits of human visual physiology for high speed motion resolution.

In summary the understanding of the EHP method and its implementation in optical shutter spectacles similar to those described in the prior art provides the entirely different and novel benefit of enhanced perception of a fast moving object by the wearer of the optical shutter spectacles. The distinction between the EHP spectacles of this invention and the optical shutter spectacles of the prior art involves three steps. The first step is their use under conditions of continuous illumination to observe a fast moving object which includes fast moving surroundings. The second step is significant visual blockage on each cycle under changing ambient brightness conditions to minimize the blur of the fast moving object in each visual frame of the viewer.

The third and most important step is the careful control of the optical shutter frequency to be near the flicker fusion frequency of the wearer under current perceived brightness conditions. This characteristic minimizes the number of double images in the visual frames of a human observer of a fast moving object. Optical shutter operation too close to the wearer's flicker fusion frequency becomes highly objectionable. Therefore optical shutters must either be designed to operate well above the flicker fusion frequency of the wearer (as taught in the prior art) or else careful shutter frequency control techniques must be provided in the design (as taught herein).

The prior art clearly teaches the need to avoid flicker by operating above the flicker fusion frequency. The prior art does not teach any advantage for the purpose of perceived brightness control of trying to operate close to the flicker fusion frequency nor does the prior art include any means to permit the optical shutters to conveniently operate close to the flicker fusion frequency of the wearer while avoiding the perception of objectionable flicker. Current design experience with sunglasses described in the prior art indicates that a minimum 25% shutter frequency margin above the expected flicker fusion frequency is needed to ensure the avoidance of flicker for sun glass operation without requiring complicated minimum frequency control techniques. Therefore operation of the optical shutter spectacles of the prior art below 125% of the expected flicker fusion frequency of typical wearers and especially incorporation into the design of convenient means to maintain this lower flicker fusion frequency margin while avoiding the perception of flicker would be evidence of the intent to achieve the enhanced high-speed perception advantages of this invention.

Having thus described the invention, what is believed to be new and novel and sought to be protected by letters of patent of the United States is as follows:

I claim:

1. The method of enhancing the ability of a human observer having a characteristic flicker fusion frequency to resolve the motion and predict the future location of a continuous linearly fast-moving object through the use of a pair of electronically powered optical shutter spectacles, the method consisting of the steps of:
    a) providing for visual observation through said shutter spectacles by a human observer of a continuously illuminated scene which includes a linearly fast-moving visible object;
    b) controlling the pair of optical shutter spectacles so that they alternately open to provide the human observer with a view of the linearly fast-moving object and then close to significantly obscure the human observer's view of the linearly fast-moving object; and
    c) selectively adjusting the shutter frequency to be less than about 125% of the characteristic flicker fusion frequency of the human observer at the brightness perceived by the human observer through the optical shutter spectacles.

2. The method according to claim 1, wherein transmissivity of the illuminated scene through said spectacles to the eye of the human observer is provided by selectively controlling the transmissivity of said spectacles to a series of pulses of selected width.

3. The method according to claim 2, wherein a selectively controlled interval of visual blockage of the illuminated scene is caused to follow each pulse of visual transmissivity.

4. As an article of manufacture:
    a) A pair of electronically powered spectacles having lenses selectively operable as optical shutters providing the wearer with an image of a field of view when the optical shutters are open and selectively operable to effect substantially complete visual blockage when the optical shutters are closed; and
    b) means mounted on said spectacles selectively adjustable to operate said optical shutter lenses at a shutter frequency less than 125% of the flicker fusion frequency of a wearer to enable a wearer to achieve enhanced resolution of fast-moving objects in the field of view.

5. The article of manufacture according to claim 4, wherein the interval of visual blockage in each cycle is fixed, and means are provided enabling the wearer to selectively adjust the shutter frequency.

6. The article of manufacture according to claim 4, wherein means are provided for selectively manually adjusting both the interval of visual blockage in each cycle and the shutter frequency to further enhance the wearer's visual resolution of fast moving objects in the field of view.

7. The article of manufacture according to claim 4 wherein the lenses include liquid crystal displays selectively operable as optical shutters.

8. The method of enhancing the ability of the human visual physiology of a human observer having a characteristic flicker fusion frequency to resolve the motion and predict the future location of a fast-moving object through the use of a pair of electronically powered optical shutter spectacles, the method consisting of the steps of:
    a) providing for visual observation through said shutter spectacles by a human observer of a continuously illuminated scene which includes a fast-moving visible object;
    b) controlling the pair of optical shutter spectacles so that they alternately open to provide the human observer with a view of the fast-moving object and then close to significantly obscure the human observer's view of the fast-moving object;
    c) selectively adjusting the shutter frequency to be less than about 125% of the characteristic flicker fusion frequency of the human observer at the brightness perceived by the human observer through the optical shutter spectacles;
    d) providing transmissivity of the illuminated scene through said spectacles to the eye of the human observer by selectively controlling the transmissivity of said spectacles to a series of pulses of selected width;
    e) causing a selectively controlled interval of visual blockage of the illuminated scene to follow each pulse of visual transmissivity; and
    f) selectively adjusting the width of the pulse of visual transmissivity and the interval of visual blockage following each pulse of visual transmissivity to a frequency just above the characteristic flicker fusion frequency of the human observer.

9. As an article of manufacture:
    a) a pair of electronically powered spectacles having lenses selectively operable as optical shutters providing the wearer with an image of a field of view when the optical shutters are open and selectively operable to effect substantially complete visual blockage when the optical shutters are closed;
    b) means mounted on said spectacles selectively adjustable to operate said optical shutter lenses at a shutter frequency less than 125% of the flicker fusion frequency of a wearer to enable a wearer to achieve enhanced resolution of fast-moving objects in the field of view;

c) means for selectively manually adjusting both the interval of visual blockage in each cycle and the shutter frequency to further enhance the wearer's visual resolution of fast-moving objects in the field of view; and d) means responsive to increases in ambient brightness after manual adjustment to cause the interval of visual blockage to increase at a constant shutter frequency whereby both constant perceived brightness and constant flicker fusion frequency of the wearer are maintained at the manually adjusted level.

10. As an article of manuufacture:

a) a pair of electronically powered spectacles having lenses selectively operable as optical shutters providing the wearer with an image of a field of view when the optical shutters are open and selectively operable to effect substantially complete visual blockage when the optical shutters are closed;

b) means mounted on said spectacles selectively adjustable to operate said optical shutter lenses at a shutter frequency less than 125% of the flicker fusion frequency of a wearer to enable a wearer to achieve enhanced resolution of fast-moving objects in the field of view;

c) means for selectively manually adjusting both the interval of visual blockage in each cycle and the shutter frequency to further enhance the wearer's visual resolution of fast moving objects in the field of view; and d) means responsive to decreases in ambient brightness after manual adjustment to cause both the interval of visual blockage and the shutter frequency to decrease whereby optimum enhanced perception of high speed motion are maintained.

11. As an article of manufacture:

a) a pair of electronically powered spectacles having lenses selectively operable as optical shutters providing the wearer with an image of a field of view when the optical shutters are open and selectively operable to effect substantially complete visual blockage when the optical shutters are closed;

b) means mounted on said spectacles selectively adjustable to operate said optical shutter lenses at a shutter frequency less than 125% of the flicker fusion frequency of a wearer to enable a wearer to achieve enhanced resolution of fast-moving objects in the field of view;

c) said lenses are each divided into a multiplicity of nodes each capable of operating independently; and d) said multiplicity of nodes includes at least one node near the center of the lens operated at a shutter frequency near the flicker fusion frequency of a wearer's center of vision and the nodes near the periphery of each lens are operated at a slightly higher shutter freqency near the flicker fusion frequency of a wearer's peripheral vision.

12. The method of enhancing the ability of a human to observe relative movement between the human and his surroundings and more clearly resolve his present location in relation to his surroundings and more accurately predict his future location in those surroundings through the use of a pair of electronically powered optical shutter spectacles, the method consisting of the steps of:

a) providing for visual observation through said shutter spectacles by a human observer of a continuously illuminated scene which includes relatively linearly fast-moving surroundings;

b) controlling the pair of optical shutter spectacles so that they alternately open to provide the human observer with a view of the relatively linearly fast-moving surroundings and then close to significantly obscure the human observer's view of the relatively linearly fast-moving surroundings; and c) selectively adjusting the shutter frequency to be close to the characteristic flicker fusion frequency of the human observer at the brightness of the surroundings perceived by the human observer through the optical shutter spectacles.

13. The method according to claim 12, wherein the shutter frequency is selectively adjusted to be less than about 125% of the characteristic flicker fusion frequency of the human observer at the brightness of the surroundings perceived by the human observer through the optical shutter spectacles.

14. The method according to claim 12, wherein the shutter frequency is selectively adjusted to be in a range more than the characteristic flicker fusion frequency of the human observer but less than about 125% of the characteristic flicker fusion frequency of the human observer at the brightness of the surroundings perceived by the human observer through the optical shutter spectacles.

15. The method according to claim 13, wherein the shutter frequency is selectively adjusted to operate near the flicker fusion frequency to provide a succession of visual frames of reference to the human observer and to provide only one visual image in each visual frame, and controlling the viewing of the image in each frame by the observe for only part of each visual frame to thereby reduce the spacial uncertainty of the position of the view in each visual frame.

16. The method according to claim 12, wherein the interval that the shutter is closed defines the duty cycle of the optical shutter, and the duty cycle is selectively adjusted to optimize maximum visual perception of high-speed motion in each visual frame when the optical shutter is open.

* * * * *